Patented July 20, 1954

2,684,387

UNITED STATES PATENT OFFICE 2,684,387

MANUFACTURE OF HYDROXY ETHERS

Donald Peter Young, Sanderstead, England, assignor to The Distillers Company Limited, Edinburgh, Scotland, a British company No Drawing. Application December 4, 1950, Serial No. 199,147

Claims priority, application Great Britain December 8, 1949

19 Claims. (Cl. 260—615)

The present invention relates to mono-ethers of octan-diols and in particular to mono-etherified derivatives of 2:4:4-trimethylpentan-diols.

It is well known that mono-etherified derivatives of alkanols are obtained by the interaction of 1:2-epoxides with alcohols, and that this reaction may be promoted by catalysts. An epoxide in which the epoxy-group is attached to the first and second atoms in the carbon chain, that is to say an epoxide represented by the general formula

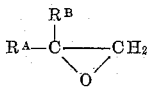

wherein $R^A$ signifies an alkyl grouping and $R^B$ signifies either an alkyl grouping or hydrogen, may give rise by reaction with alcohols to two isomeric mono-etherified-alkanols represented by the formulae (I)   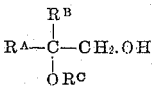

and
(II)   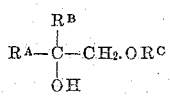

where $R^C$ signifies the alkyl grouping corresponding to the reacted alcohol ROH. It is further known that, in general, the interaction between such epoxides and alcohols in the presence of catalysts of an acidic nature gives rise to either or usually both of the above-mentioned alkoxy-alkanols, and that the reaction in the presence of basic catalysts, on the other hand, gives rise predominantly to the first of the two alkoxy-alkanols represented above, that is to say the isomer in which the alkoxy group is attached to the first and the hydroxyl group to the second atom of the carbon chain.

The mono-ethers of 2:4:4-trimethylpentandiol have not been described before. These hydroxy ethers are derived from 1:2-epoxy-2:4:4-trimethylpentane of the formula

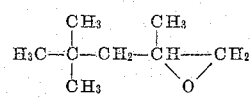

which will be called in the following "the epoxide." The epoxide may be prepared by the oxidation in the liquid phase of 2:4:4-trimethylpentene-1 by means of molecular oxygen whilst the pH of the liquid reaction mixture is between 5 and 12 in accordance with Patent No. 2,650,927 which patent was copending herewith.

The mono-etherified trimethylpentan-diols according to this invention have the formulae (III)   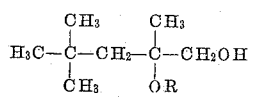

and
(IV)   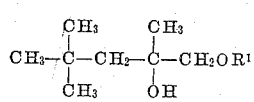

In Formula III R signifies an alkyl or a hydroxylated alkyl group whilst in Formula IV $R^1$ represents an alkyl, a hydroxylated alkyl, or aryl group.

Suitable alcohols for the preparation of ethers of the general Formula III in accordance with this modification of the present invention are primary aliphatic alcohols, such as, methyl, ethyl, propyl and normal butyl alcohol. Secondary alcohols such as isopropanol were found not to react in the desired manner in the presence of acid catalysts. Further suitable alcohols for carrying out the esterification according to the invention are polyhydric alcohols such as ethylene glycol, propane-1:3-diol, 2-methyl-pentane-2:4-diol and glycerol. The products obtained with these polyhydric alcohols are mono-hydroxy alkyl ethers of the polyhydric alcohol used.

The reaction between the epoxide and the alcohol in the presence of strongly acid catalysts is preferably carried out by slowly adding the epoxide to the alcohol with efficient agitation, the latter to be advantageously in large excess and containing the catalyst in solution. Suitable catalysts for the preparation of said ethers are, for instance, sulphuric acid and phosphoric acid. Of these sulphuric acid is preferred as by this means the reaction proceeds rapidly. A further suitable catalyst is, for instance, boron trifluoride. Hydrochloric acid, on the other hand, was found not to promote the reaction. The reaction is regulated in such a manner that the temperature does not rise substantially above 50° C. When weaker catalysts than sulphuric acid such as phosphoric acid are used however, the temperature is advantageously raised since the reaction proceeds very sluggishly at lower temperatures.

For the production of ethers of the formula (IV)   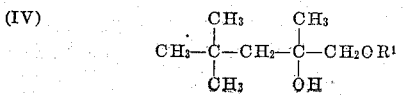

according to the present invention, the epoxide is reacted with hydroxy-compounds such as primary fatty alcohols, phenols, cresols, naphthols, such as alpha- or beta-naphthol, and polyhydric alcohols in the presence of a basic catalyst. As basic catalysts may be used the hydroxides, alkoxides, phenoxides or naphthoxides of alkali metals such as sodium or potassium, furthermore the alkali metal salts of lower fatty acids or other strongly basic compounds. The reaction in this case is preferably carried out at temperatures exceeding 100° C. such as from 100 to 150° C. with an excess of the hydroxy-compound and when the hydroxy compounds boil at a temperature below that at which the reaction is carried out, preferably in a closed vessel. Higher alcohols such as n-butanol can, however, be reacted at these temperatures in an open vessel, for example by boiling under a reflux condenser. Lower alcohols such as ethanol may alternatively be brought into reaction at reflux temperature, but then on account of the lower temperature thereby attainable it is necessary to employ a greater proportion of catalyst, such as one molecular proportion per molecule of epoxide employed.

Whilst, as has been mentioned above, isopropanol and other secondary alcohols do not furnish appreciable yields of the ether when reacted with the epoxide in the presence of acidic catalysts the etherification proceeds, although slowly and not very satisfactorily, in the presence of alkaline catalysts.

It has been found that when epoxide is reacted with alcohols in the presence of acids almost exclusively ethers according to Formula III are formed. This is in contrast to the general experience according to which a mixture of the two ethers according to the general Formulae I and II results.

The ethers in accordance with this invention and obtained by the reaction of the epoxide with hydroxy compounds may be recovered from the reaction mixture, for instance, by extraction with ether or by fractional distillation, preferably after neutralisation and subsequent washing with water to remove the catalyst.

The etherified alcohols of the general formula

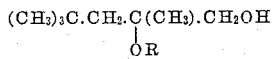

in which R represents a radical corresponding to the alcohol used for etherification, which are the result of the acid catalysed reaction can readily be esterified and may then be used as plasticisers and solvents. The isomeric compounds with the ether group linked to the terminal carbon atom may be used for example as solvents or brake fluid components.

The following examples serve to illustrate the manner in which the mono-ethers may be prepared from monohydric alcohols:

EXAMPLE 1

50 grams of 1,2-epoxy-2:4:4-trimethylpentane hereafter referred to as the epoxide were slowly added to 250 cc. of mechanically stirred ethanol containing 0.1 gram of sulphuric acid. At the end of the exothermic reaction the acid was neutralized and the mixture fractionally distilled. 19.9 grams of 2-ethoxy-2:4:4-trimethylpentan-1-ol were obtained with some lower boiling fractions. 2-methoxy- and 2-n-butoxy-2:4:4-trimethylpentan-1-ol were similarly obtained by using the corresponding alcohols.

EXAMPLE 2

1,000 grams of the epoxide as used in Example 1 were slowly added to 4,000 cc. of methanol which contained 32 cc. of boron trifluoride-diethyl ether complex and was stirred during the addition. At the end of the reaction, the catalyst was destroyed by an excess of aqueous sodium hydroxide, and after evaporation of the methanol the residue was washed free from inorganic salts with water, dried and fractionally distilled. A yield of 749 grams of 2-methoxy-2:4:4-trimethylpentan-1-ol was obtained.

EXAMPLE 3

50 grams of the epoxide were allowed to react with 200 cc. of methanol and 1.6 cc. of boron trifluoride etherate as described in Example 2. At the end of the reaction the mixture was boiled under reflux with 5.4 grams of sodium fluoride for half-an-hour and after filtration was then substantially free from boron trifluoride. Fractional distillation then produced firstly unchanged methanol, then unchanged epoxide and by-products and finally 39 grams of 2-methoxy-2:4:4-trimethyl-pentan-1-ol.

EXAMPLE 4

64 grams of the epoxide, 250 cc. of ethyl alcohol and 0.3 cc. of 85% phosphoric acid were boiled under reflux for 5 hours after which, by working up the reaction mixture as described in Example 1, 34.0 grams of 2-ethoxy-2:4:4-trimethylpentan-1-ol were recovered from the reaction mixture.

EXAMPLE 5

23 grams of metallic sodium were dissolved in 500 cc. of ethyl alcohol and 128 grams of the epoxide added. After boiling for 3 hours under reflux, the ethyl alcohol was evaporated off, the residue washed with water and the organic product extracted therefrom with ether. By fractional distillation 118 grams of 1-ethoxy-2:4:4-trimethyl-pentan-2-ol were obtained.

The corresponding 1-methoxy- and 1-isopropoxy-2:4:4-trimethylpentan-2-ol were similarly obtained.

EXAMPLE 6

60 grams of the epoxide and 300 grams of ethanol containing 3 grams of sodium ethoxide were heated in an autoclave to 150° C. for 5 hours. After cooling the alkali was neutralised with acetic acid and the ethyl alcohol evaporated off. The washed residue yielded 53.5 grams of 1-ethoxy-2:4:4-trimethylpentan-2-ol. A slower conversion was observed at 100° C.

The corresponding isopropoxy compound was similarly obtained although in smaller yield.

EXAMPLE 7

A mixture of 64 grams of the epoxide, 20 grams of sodium hydroxide and 250 cc. of ethyl alcohol was boiled under reflux for 4 hours and worked up as described in Example 5 to give 57 grams of 1-ethoxy-2:4:4-trimethylpentan-2-ol.

EXAMPLE 8

A mixture of 64 grams of the epoxide, 250 cc. n-butanol and 5 grams of sodium hydroxide was boiled under reflux for 3 hours and similarly worked up as described in Example 5 giving 57.7 grams of 1-n-butoxy-2:4:4-trimethylpentan-2-ol.

EXAMPLE 9

To 47 grams of phenol in 40 cc. of ethanol and 50 cc. of water were added 20 grams of NaOH and then 64 grams of the epoxide. The mixture was heated under reflux for 8 hours at the end of which water was added and the product extracted with ether. 45 grams of 1-phenoxy-2:4:4-trimethylpentan-2-ol were obtained and 17 grams of phenol was recovered by acidification of the spent aqueous layer.

EXAMPLE 10

A mixture of 64 grams of the epoxide, 200 grams of pure lauryl alcohol, and 10 grams of sodium hydroxide was heated in a stirred autoclave at 175° C. for 3 hours. The product was washed with water and fractionally distilled, yielding 22 grams of 1-n-dodecyloxy-2:4:4-trimethylpentan-2-ol.

EXAMPLE 11

72 grams beta-naphthol was dissolved in 100 cc. of a 20% aqueous sodium hydroxide solution and 64 grams of 1:2-epoxy-2:4:4-trimethylpentane dissolved in 100 cc. of ethanol was added. The mixture was boiled under reflux for 24 hours after which an equal volume of 5% aqueous sodium hydroxide was added and the product extracted with ether. Some unchanged naphthol was recovered from the aqueous phase by acidification. The washed ethereal extract was distilled up to 125° C./10 mm. Hg, when the residue solidified on cooling. It consisted of 52 grams 1-beta-naphthoxy-2:4:4 - trimethyl-pentan-2-ol. This compound distilled at 136–140° C./3µ and crystallized from light petroleum in asbestos-like needles, melting point 46–47° C.

The physical properties of the mono-ethers from monohydric alcohols according to the invention are shown in the following table. These mono-ethers are substantially insoluble in water.

*Table I*

| Compound | B. P. | refract. ind. $n_D^{20}$ | spec. grav. $d_4^{20}$ |
|---|---|---|---|
| 2-Methoxy-2:4:4-trimethylpentan-1-ol | 83–86° C./10 mm | 1.4431 | 0.9129 |
| 1-Methoxy-2:4:4-trimethylpentan-2-ol | 65–66° C./10 mm | 1.4294 | 0.8802 |
| 2-Ethoxy-2:4:4-trimethylpentan-1-ol | 95–96° C./12 mm | 1.4406 | 0.8994 |
| 1-Ethoxy-2:4:4-trimethylpentan-2-ol | 80° C./20 mm | 1.4277 | 0.8693 |
| 1-iso-Propoxy-2:4:4-trimethylpentan-2-ol | 79–83° C./10 mm | 1.4272 | 0.8608 |
| 2-n-Butoxy-2:4:4-trimethylpentan-1-ol | 114–119° C./10 mm | 1.4408 | 0.8802 |
| 1-n-Butoxy-2:4:4-trimethylpentan-2-ol | 100–104° C./10 mm | 1.4335 | 0.8668 |
| 1-Phenoxy-2:4:4-trimethylpentan-2-ol | 149° C./10 mm | 1.5003 | 0.9786 |
| 1-n-Dodecyloxy-2:4:4-trimethylpentan-2-ol | 168–180° C./0.5 mm | 1.4474 | |
| 1-n-Naphthoxy-2:4:4-trimethylpentan-2-ol | 136–140° C./3µ | M. P. 46–47° C. | |

The following examples illustrate the manner in which the mono-ethers of polyhydric alcohols may be prepared according to the invention.

EXAMPLE 12

128 grams of 1:2-epoxy-2:4:4-trimethylpentane were added slowly to a stirred mixture of 150 grams of ethylene glycol and 1.5 cc. boron trifluoride etherate, the temperature being kept below 45° C. Sufficient concentrated sodium hydroxide solution was then added to neutralise all the boron trifluoride, and unchanged epoxide and glycol were distilled off up to 120° C./10 mm. The residue was taken up in ether, washed with water, dried and after removal of the solvent was distilled in vacuo. 77 grams of 2(2'-hydroxyethoxy)-2:4:4-trimethylpentan-1-ol was thereby obtained. The product forms a bis-alpha-gamma-gamma-trimethyl-valerate, B. P. 160–164° C./2µ and a bis-3:5-dinitrobenzoate, M. P. 107–109° C.: the structure of the product has been proved by elementary analysis, Zerewitinov determination of active hydrogen, and by the detection of two readily esterified and therefore primary hydroxyl groups per molecule.

EXAMPLE 13

128 grams of the epoxide, 150 grams of ethylene glycol and 8 grams of sodium hydroxide were heated for 3 hours at 175° C. in an autoclave with a reciprocating stirrer. The mixture was diluted with water and the product isolated by extraction with ether and distillation. 87 grams of 1(2 - hydroxyethoxy) - 2:4:4 - trimethylpentan-2-ol was obtained. This product generally resembled in its properties the isomeric product of Example 12 but the two hydroxyl groups in the molecule were shown to be different from one another in that only one is easily esterified, the other being presumably tertiary in accordance with the proposed structure.

EXAMPLE 14

128 grams of the epoxide was added to a mixture of 150 grams of propane-1:3-diol and 1 cc. of boron trifluoride etherate following the procedure described in Example 12. The mixture was diluted with water, sufficient sodium hydroxide added to neutralise the boron trifluoride and the product extracted into ether and distilled. 79 grams of 2(2-hydroxy-n-propoxy)-2:4:4-trimethylpentan-1-ol were obtained. The product formed a di-n-nitrobenzoate, M. P. 65–67° C.

EXAMPLE 15

64 grams of the epoxide were added to a mixture of 150 grams of 2-methylpentan-2:4-diol and 1 cc. of boron trifluoride etherate following the method of Example 14. 14 grams of the product identified as 2-4'-hydroxy-4'-methyl-2'-pentyloxy)-2:4:4-trimethylpentan-1-ol was obtained; it contained one easily esterified and one difficultly esterified and therefore tertiary hydroxyl group per molecule.

EXAMPLE 16

128 grams of the epoxide were added to 300 grams of glycerol and 2 cc. of boron trifluoride etherate following the procedure of Example 14. The product was soluble in water but could be extracted therefrom by ether. 57 grams of the product 2-(2':3'-dihydroxy-n-propoxy)-2:4:4-trimethylpentan-1-ol was thereby obtained. The product formed a tri-n-nitrobenzoate, M. P. 128–130° C.

The ethers derived from polyhydric alcohols and prepared as described in Examples 12–16 are colorless viscous liquids. Some of their physical properties are given in Table II.

Table II

| Compound | B. P. | Refract. index $n_D^{20}$ | Solubility in water |
|---|---|---|---|
| 2-(2'-hydroxyethoxy)-2:4:4-trimethylpentan-1-ol | 114–116° C./0.5 mm | 1.4597 | slight. |
| 1-(2'-hydroxyethoxy)-2:4:4-trimethylpentan-2-ol | 97° C./0.4 mm | 1.4541 | Do. |
| 2-(2'-hydroxy-n-propoxy)-2:4:4-trimethylpentan-1-ol | 130–134° C./0.5 mm | 1.4623 | insoluble. |
| 2-(4'-hydroxy-4'-methyl-2-pentyloxy)-2:4:4-trimethyl-pentan-1-ol | 113–115° C./0.1 mm | 1.4548 | Do. |
| 2-(2':3'-dihydroxy-n-propoxy)-2:4:4-trimethyl-pentan-1-ol | 154–158° C./0.3 mm | 1.4688 | soluble. |

I claim:

1. Ethers of the general formula selected from the group consisting of

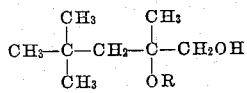

and

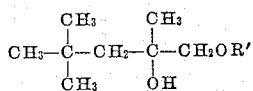

where R is a radical selected from the group consisting of alkyl and a hydroxylated alkyl radical and R' is a radical selected from the group consisting of alkyl, aryl and hydroxylated alkyl radicals.

2. A process which comprises reacting 1:2-epoxy-2:4:4-trimethylpentane in the presence of a catalyst with a hydroxy compound to produce an ether of the general formula selected from the group consisting of (A)

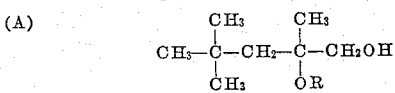

and (B)

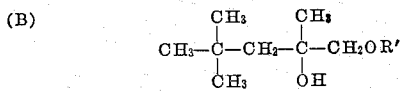

where R is a radical selected from the group consisting of alkyl and a hydroxylated alkyl radical and R' is a radical selected from the group consisting of alkyl, aryl and hydroxylated alkyl radicals, said hydroxy compound for producing ether (A) being selected from the group consisting of hydroxy compounds of an alkyl and a hydroxylated alkyl radical, and said hydroxy compound for producing ether (B) being selected from the group consisting of hydroxy compounds of an alkyl, an aryl, and a hydroxylated alkyl radical.

3. A process which comprises reacting 1:2-epoxy-2:4:4-trimethylpentane in the presence of an acidic catalyst with a hydroxylated compound selected from the group consisting of monohydric primary aliphatic and polyhydric aliphatic alcohols to produce an ether having the formula

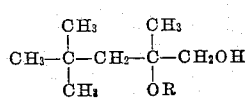

where R is a radical selected from the group consisting of alkyl and a hydroxylated alkyl radical.

4. Process as claimed in claim 3 wherein the acidic catalyst is selected from the group consisting of sulphuric acid, phosphoric acid and boron trifluoride.

5. Process as claimed in claim 3 which comprises carrying out the etherification at a temperature of about 50° C.

6. A process which comprises reacting 1:2-epoxy-2:4:4-trimethylpentane with a hydroxy compound selected from the group consisting of monohydric aliphatic alcohols, polyhydric aliphatic-alcohols, phenols and naphthols in the presence of a basic catalyst to produce an ether of the formula

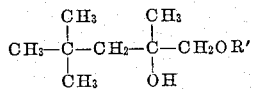

where R' is a radical selected from the group consisting of alkyl, aryl and hydroxylated alkyl radicals, said hydroxylated alkyl radicals being selected from the group consisting of an alkyl and a hydroxylated alkyl radical.

7. Process as claimed in claim 6 which comprises carrying out the condensation at a temperature between 60 and 250° C.

8. Process as claimed in claim 6 wherein alkali metal phenoxide is used as catalyst in the etherification with a phenol.

9. Process as claimed in claim 6 which comprises using alkali metal naphthoxide for the etherification with a naphthol.

10. A process in accordance with claim 6 in which the alcohol is methyl alcohol.

11. A process in accordance with claim 6 in which the alcohol is ethyl alcohol.

12. A process in accordance with claim 6 in which the alcohol is lauryl alcohol.

13. A process in accordance with claim 6 in which the alcohol is ethylene glycol.

14. A process in accordance with claim 6 in which the alcohol is propane-1:3 diol.

15. The compound 2-methoxy-2:4:4-trimethylpentan-1-ol.

16. The compound 1-ethoxy-2:4:4-trimethylpentan-2-ol.

17. The compound 1-n-dodecyloxy-2:4:4-trimethylpentan-2-ol.

18. The compound 2-(2'-hydroxyethoxy)-2:4:4-trimethylpentan-1-ol.

19. The compound 1-(2'-hydroxyethoxy)-2:4:4-trimethylpentan-2-ol.

References Cited in the file of this patent

UNITED STATES PATENTS

| Number | Name | Date |
|---|---|---|
| 2,327,053 | Marple et al. | Aug. 17, 1943 |
| 2,380,185 | Marple et al. | July 10, 1945 |
| 2,491,533 | Swern | Dec. 20, 1949 |